(12) United States Patent
Xu

(10) Patent No.: US 10,773,319 B2
(45) Date of Patent: Sep. 15, 2020

(54) HAND-HELD PIPE CUTTING DEVICE

(71) Applicant: Shanghai C-Mart Tools Co., Ltd., Shanghai (CN)

(72) Inventor: Junqiao Xu, Yuyao (CN)

(73) Assignee: Shanghai C-Mart Tools Co., Ltd., Shanghai (CN)

( * ) Notice: Subject to any disclaimer, the term of this patent is extended or adjusted under 35 U.S.C. 154(b) by 0 days.

(21) Appl. No.: 16/355,784

(22) Filed: Mar. 17, 2019

(65) Prior Publication Data
US 2019/0329335 A1 Oct. 31, 2019

(30) Foreign Application Priority Data

Apr. 28, 2018 (CN) .......................... 2018 2 0637291

(51) Int. Cl.
| | |
|---|---|
| *B23D 33/02* | (2006.01) |
| *B23D 21/08* | (2006.01) |
| *B23D 45/12* | (2006.01) |
| *B23Q 3/06* | (2006.01) |

(52) U.S. Cl.
CPC ........... *B23D 33/025* (2013.01); *B23D 21/08* (2013.01); *B23D 45/12* (2013.01); *B23Q 3/064* (2013.01); *B23Q 2240/007* (2013.01); *B23Q 2703/10* (2013.01)

(58) Field of Classification Search
CPC ...... B23D 33/025; B23D 21/08; B23D 45/12; B23D 21/04; B26D 3/169; B26D 1/16; B26D 7/7635; B26D 2007/017; B23Q 3/064; B23Q 2703/10; B26B 17/02; B26B 7/12; B26B 25/005; Y10T 82/16447
USPC ... 83/745, 169, 628, 629, 54, 178, 181, 182, 83/183, 188; 30/101, 102, 92, 115, 241, 30/245, 92.5, 96, 97, 116, 246, 272.1, 30/243; 81/82, 70.2
See application file for complete search history.

(56) References Cited

U.S. PATENT DOCUMENTS

| | | | | |
|---|---|---|---|---|
| 3,100,934 A | * | 8/1963 | Jonasson ................ | B23D 21/08 30/102 |
| 3,106,776 A | * | 10/1963 | Plas ....................... | B23D 21/08 30/102 |
| 3,240,088 A | * | 3/1966 | Samuels ................ | B23D 21/08 82/128 |

* cited by examiner

*Primary Examiner* — Ghassem Alie
(74) *Attorney, Agent, or Firm* — Bay State IP, LLC

(57) ABSTRACT

A cutter includes an arc main body having a clamping groove in which a steel pipe may be putted, a plurality of bearings are mounted on the inner side of the main body, a fixed platform is arranged at the back end of the main body, a fixed block is fixed on the fixed platform, a lead-screw drive group penetrates the fixed block, the lead-screw drive group comprises a slide bar and a lead screw, the slide bar penetrates the fixed block, the lead screw is arranged on the slide bar and matches with the slide bar, a blade is mounted at the front end of the slide bar, the back end of the lead screw is connected with a gear drive group, the gear drive group is connected with a handle, and the fixed block is provided with a toothed fastener matching with a groove on the lead screw.

7 Claims, 3 Drawing Sheets

HAND-HELD PIPE CUTTING DEVICE

CROSS REFERENCE TO RELATED APPLICATION

This application claims the benefit of and takes priority from Chinese Patent Application Serial No. 201820637291.9 filed on Apr. 28, 2018, the contents of which are herein incorporated by reference

TECHNICAL FIELD

The present disclosure relates to a cutting tool, and specifically to a steel pipe cutter.

BACKGROUND

People generally use a steel pipe cutter to cut off steel pipes when the steel pipes need to be cut off. However, the steel pipe cutter of the prior art has a plurality of problems in use, for example, a blade is easy to deviation when the steel pipe is cut off, and the steel pipe is hard to be cut off in a rolling manner.

SUMMARY

In order to overcome deficiencies of the prior art, the present disclosure provides a cutter, wherein a blade does not generate deviation and the labors are saved in a cutting process. The pinion on the handle drives the big gear into the cutter screw, and the diameter ratio of the big gear to the big gear is 2 to 1, so as to achieve labor-saving effect.

A technical scheme provided by the present disclosure is as follows: a cutter comprises an arc main body, the main body has a clamping groove in which a steel pipe may be putted, a plurality of bearings are mounted on the inner side of the main body, a fixed platform is arranged at the back end of the main body, a fixed block is fixed on the fixed platform, a lead-screw drive group penetrates the fixed block, the lead-screw drive group comprises a slide bar and a lead screw, the slide bar penetrates the fixed block, the lead screw is arranged on the slide bar and matches with the slide bar, a blade is mounted at the front end of the slide bar, the back end of the lead screw is connected with a gear drive group, the gear drive group is connected with a handle, and the fixed block is provided with a toothed fastener matching with a groove on the lead screw.

Furthermore, the slide bar is provided with an accommodating groove with an upward opening, the lead screw is mounted in the accommodating groove, and the back end of the lead screw extends out of the accommodating groove and then is connected with the gear drive group.

Furthermore, the gear drive group comprises a gearbox, a large gear and a pinion, the large gear and the pinion are arranged in the gearbox, the large gear and the pinion are meshed with each other, the large gear is connected with the back end of the lead screw, and the back end of the pinion is connected with the handle through a connecting rod.

Furthermore, the bottom of the front end of the toothed fastener is provided with a plurality of fixture blocks, and the fixture blocks are locked in the groove on the outer wall of the lead screw.

Furthermore, the fixed block is provided with a via hole which the slide bar penetrates, the back end of the fixed block is fixedly provided with a first spring, the top end of the first spring is fixed to the back end of the toothed fastener, a through hole is formed in the center of the top end of the fixed block, and the front ends of the fixture blocks extend in the through hole.

Furthermore, a second spring is arranged between the bottom of the front end of the slide bar and the fixed block.

Furthermore, a stop block is arranged at the top of the front end of the slide bar.

By applying the cutter provided by the present disclosure, the following beneficial effects are achieved: the fixed block matches with the lead screw drive group in a mounting process so that the slide bar does not generate rotation deviation during motion, and the blade does not generate deviation in the steel pipe cutting process; and the bearings are utilized to be in contact with the steel pipe, and the bearings rotates easily, so the labors are saved when the steel pipe is cut off.

In the accompanying drawings: 1-main body; 1.1-clamping groove; 2-bearing; 3-fixed platform; 4-fixed block; 41-via hole; 42-through hole; 5-slide bar; 51-accommodating groove; 6-lead screw; 61-groove; 7-blade; 8-handle; 9-toothed fastener; 91-fixture block; 10-first spring; 11-second spring; 12-stop block; 13-liner; 14-faceplate; 15-gearbox; 16-large gear; 17-pinion; and 18-connecting rod.

DESCRIPTION OF THE EMBODIMENTS

In order to intuitively and completely understand the technical scheme of the present disclosure, the following performs nonrestrictive feature description in conjunction with the accompanying drawings of the present disclosure.

Figure 1:
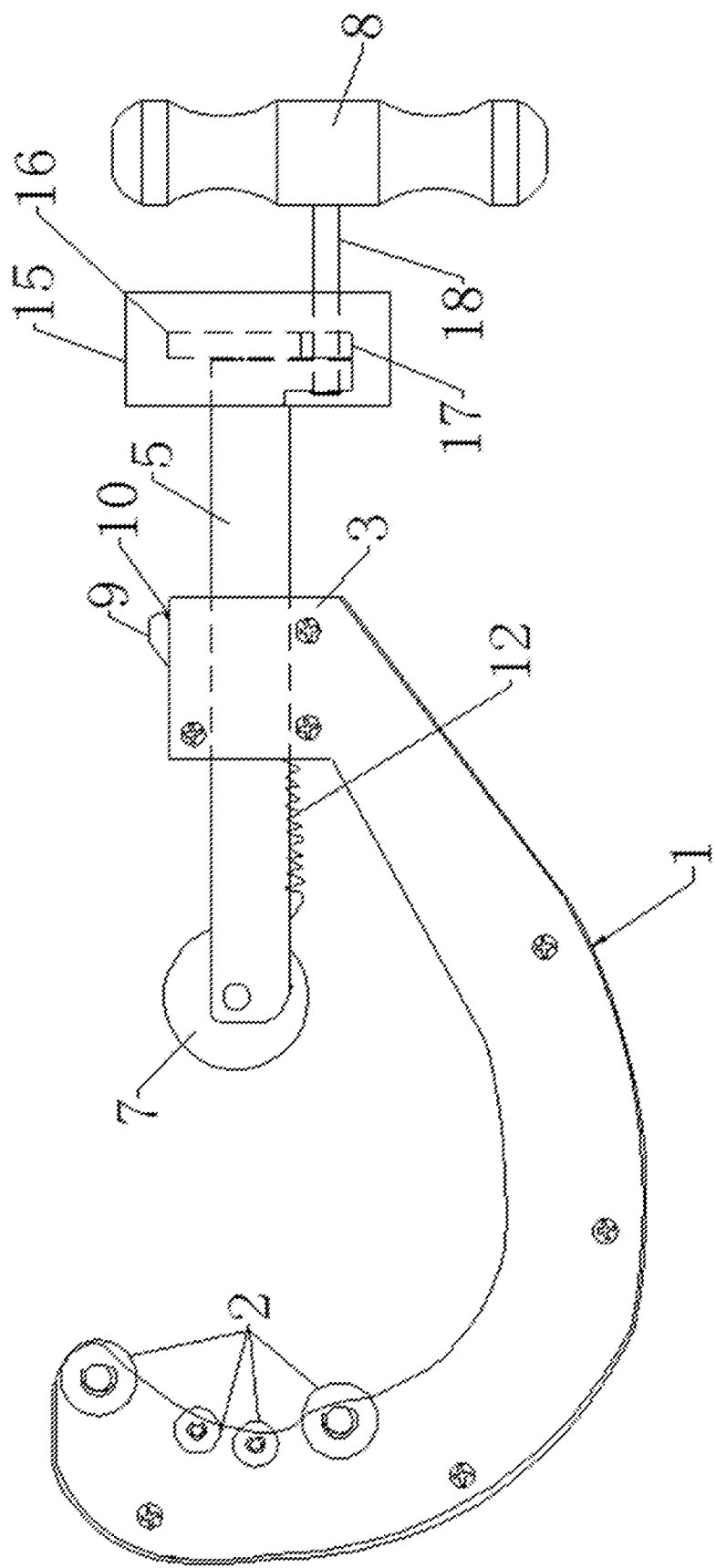
FIG. 1 is a schematic diagram of an integral structure of the present disclosure.
Figure 2:
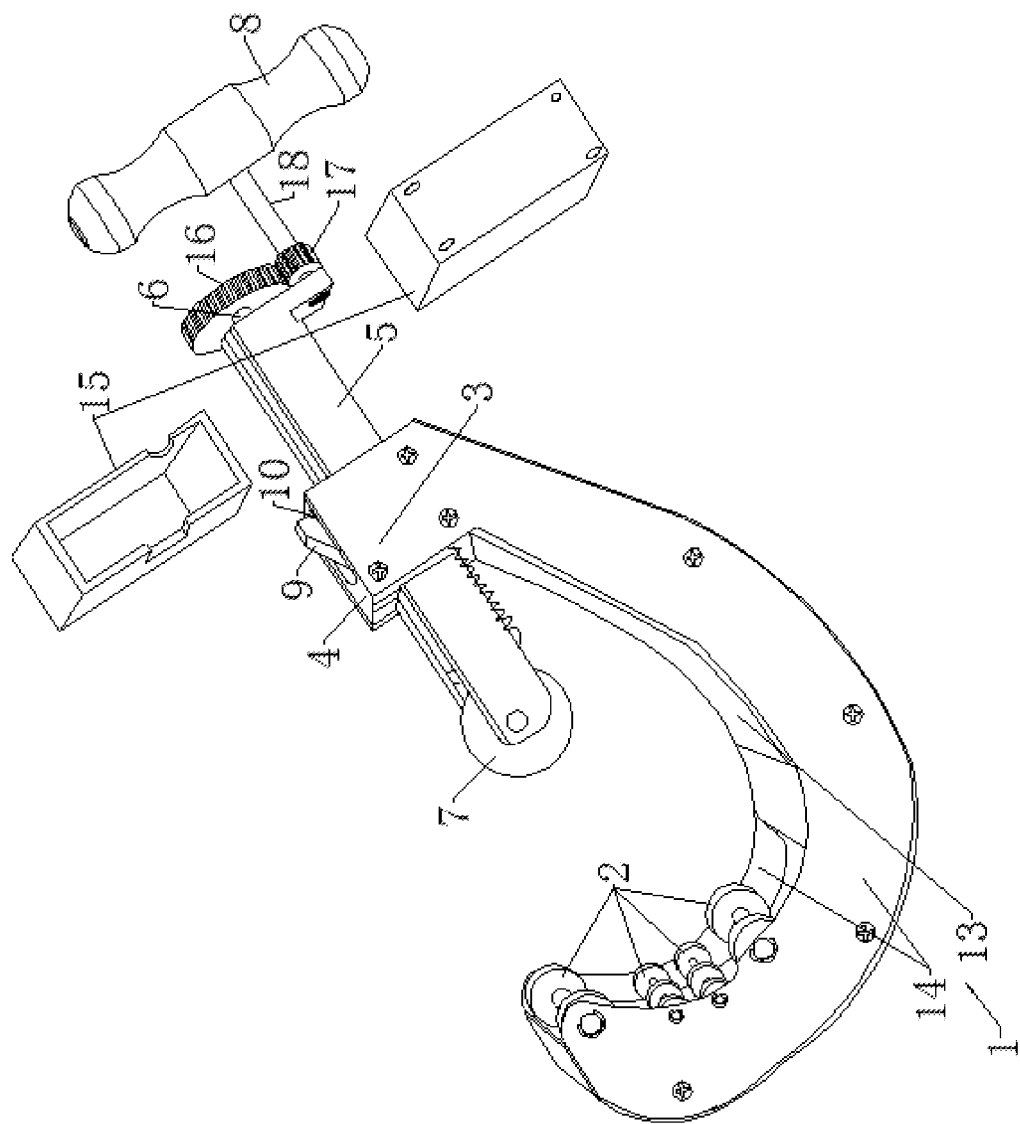
FIG. 2 is a partial exploded view of the present disclosure.
Figure 3:
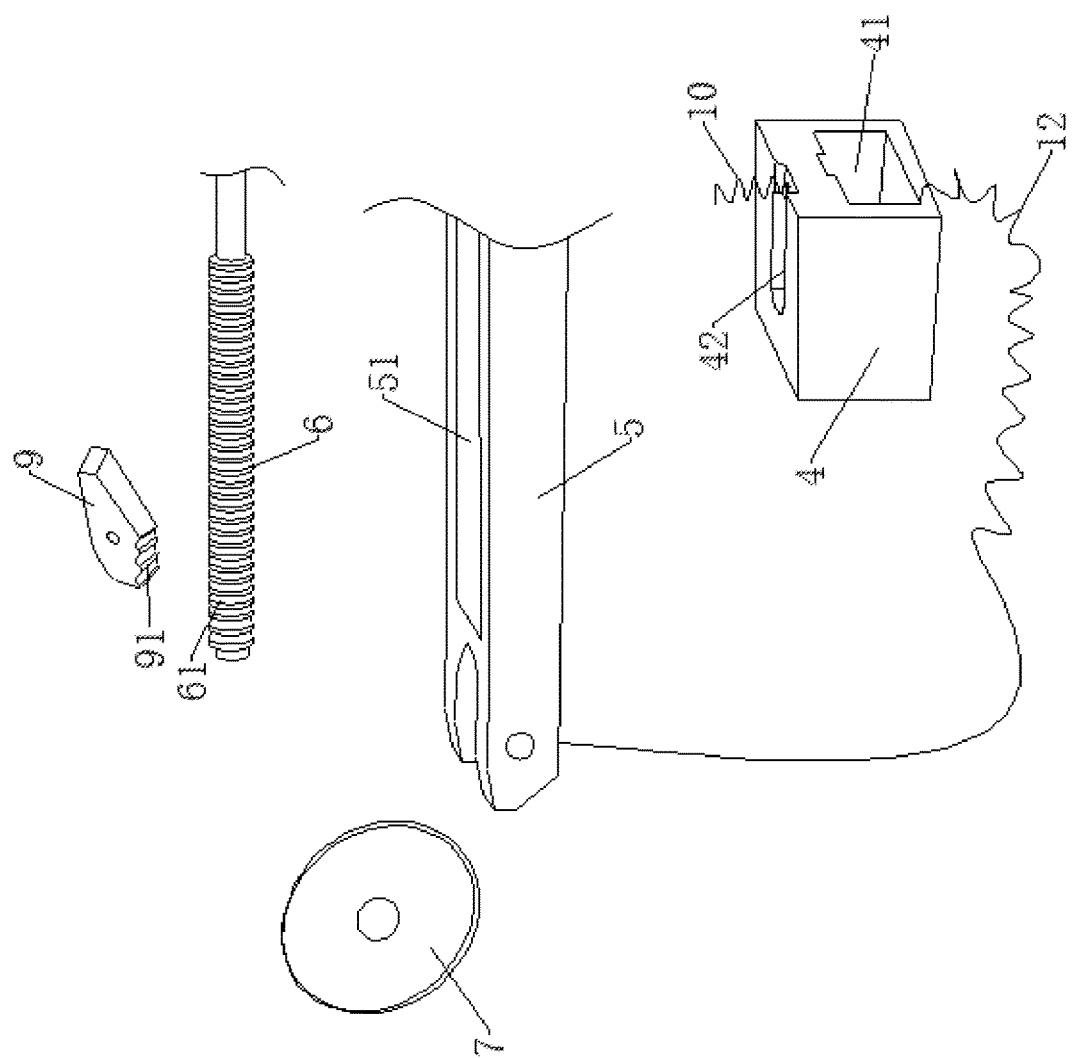
FIG. 3 is an installation schematic diagram of a lead screw drive group, a toothed fastener, a fixed block and a blade, provided by the present disclosure.

As shown in FIG. 1 to FIG. 3, a cutter comprises an arc main body 1, the main body 1 has a clamping groove 1.1 in which a steel pipe may be putted, a plurality of bearings 2 are mounted on the inner side of the main body 1, a fixed platform 3 is arranged at the back end of the main body 1, a fixed block 4 is fixed on the fixed platform 3, a lead-screw drive group penetrates the fixed block 4, the lead-screw drive group comprises a slide bar 5 and a lead screw 6, the slide bar 5 penetrates the fixed block 4, the lead screw 6 is arranged on the slide bar 5 and matches with the slide bar 5, a blade 7 is mounted at the front end of the slide bar 5, the back end of the lead screw 6 is connected with a gear drive group, the gear drive group is connected with a handle 8, and the fixed block 4 is provided with a toothed fastener 9 matching with a groove 61 on the lead screw 6.

The slide bar 5 is provided with an accommodating groove 51 with an upward opening, the lead screw 6 is mounted in the accommodating groove 51, and the back end of the lead screw 6 extends out of the accommodating groove 51 and then is connected with the gear drive group. The handle 8 rotates to drive a pinion 17 to rotate, the pinion 17 rotates to drive a large gear 16 to rotate, the large gear 16 rotates to drive the lead screw 6 to rotate, and then the lead screw 6 drives the slide bar 5 to do rectilinear motion.

The gear drive group comprises a gearbox 15, the large gear 16 and the pinion 17, the large gear 16 and the pinion 17 are arranged in the gearbox 15, the large gear 16 and the pinion 17 are meshed with each other, the large gear 16 is connected with the back end of the lead screw 6, and the back end of the pinion 17 is connected with the handle 8 through a connecting rod 18.

The bottom of the front end of the toothed fastener 9 is provided with a plurality of fixture blocks 91, and the fixture blocks 91 are locked in the groove 61 on the outer wall of the lead screw 6. The fixed block 4 is provided with a via hole 41 which the slide bar 5 penetrates, the back end of the fixed block 4 is fixedly provided with a first spring 10, the top end of the first spring 10 is fixed to the back end of the toothed fastener 9, a through hole 42 is formed in the center of the top end of the fixed block 4, and the front ends of the fixture blocks 91 extend in the through hole 42. When the back end of the toothed fastener 9 is pressed down, the first spring 10 is compressed, the front end of the toothed fastener 9 tilts up, the fixture blocks 91 separate from the groove 61 of the lead screw 6, at this time, the lead screw 6 and the slide bar 5 may move forwards and backwards; and after the toothed fastener 9 is loosened, the fixture blocks 91 are locked in the groove 61, and then the lead screw 6 is limited.

A second spring 11 is arranged between the bottom of the front end of the slide bar 5 and the fixed block 4. When the slide bar 5 moves forwards, the second spring 11 is stretched, so, when the slide bar 5 moves backwards, the spring may help the slide bar 5 to move backwards quickly and smoothly.

A stop block 12 is arranged at the top of the front end of the slide bar 5, and the stop block 12 is used for stopping the fixed block 4.

There are four bearings 2, wherein two bearings 2 are arranged between the other two bearings 2. As shown in FIG. 1, the sizes of the two bearings 2 are different from the sizes of the other two bearings 2, the two bearings 2 are applied to small steel pipes, and the other two bearings 2 are applied to large steel pipes.

A liner 13 is arranged on the inner side of the main body 1. The main body 1 comprises two faceplates 14 and the liner 13 which is arranged between the two faceplates 14, the two faceplates 14 are correspondingly formed in a punching manner, and the liner 13 is formed between the two faceplates 14 in an injection molding manner.

In use, a steel pipe is putted in the clamping groove 1.1 of the main body 1 to be in contact with the bearings 2, the toothed fastener 9 is pressed down, the slide bar 5 is pushed inwards till the blade 7 is in contact with the steel pipe, the handle 8 is turned, the handle 8 drives the lead screw 6 to move by the gear drive group, the lead screw 6 drives the slide bar 5 to move forwards, the blade 7 also moves forwards to press the steep pipe, so, the blade 7 and the steel pipe are in close contact with each other, then the steep pipe is turned or the whole cutter is turned corresponding to the steel pipe for several times so that the steep pipe is cut off.

According to the cutter provided by the present disclosure, the fixed block 4 matched with the lead screw drive group in a mounting process so that the slide bar 5 does not generate rotation deviation during motion, and the blade 7 does not generate deviation in the steel pipe cutting process; and the bearings 2 are utilized to be in contact with the steel pipe, and the bearings 2 rotates easily, so the labors are saved when the steel pipe is cut off.

Certainly, the above are preferred embodiments of the present disclosure merely, and are not intended to limit the protection scope of the present disclosure. Any simple modifications and equivalent structure changes made according to the specification and accompanying drawings of the present disclosure all are intended to be included in the protection scope of the present disclosure.

What is claimed is:

1. A hand-held pipe cutting device comprising:
   an arc main body, wherein the arc main body comprises a clamping groove which is configured to receive a steel pipe;
   a liner arranged on an inner side of the arc main body;
   a pair of faceplates located on the arc main body, wherein the liner is located between the pair of faceplates, such that the pair of faceplates are formed in a punching manner, and the line is formed between the faceplates via an injection molding;
   a set of four bearings are mounted on an inner side of the arc main body, wherein a pair of small bearings are located between a pair of large bearings;
   a fixed platform which is arranged at a back end of the arc main body;
   a fixed block, wherein the fixed block is fixed on the fixed platform;
   a lead-screw drive group which penetrates the fixed block, and the lead-screw drive group further comprises:
   a slide bar; and
   a lead screw, wherein the slide bar penetrates the fixed block, and the lead screw is located on the slide bar and aligns with the slide bar;
   a blade is mounted at a front end of the slide bar,
   a toothed fastener, wherein the toothed fastener is located on the fixed block and works in conjunction with a groove on the lead screw;
   wherein a back end of the lead screw is connected to a gear drive group, and the gear drive group is connected at one end to the slide bar and at the other end to a handle.

2. The hand-held pipe cutting device according to claim 1, wherein the slide bar is provided with an accommodating groove with an upward opening, the lead screw is mounted in the accommodating groove, and the back end of the lead screw extends out of the accommodating groove and then is connected with the gear drive group.

3. The hand-held pipe cutting device according to claim 1, wherein the gear drive group comprises a gearbox, a large gear and a pinion, the large gear and the pinion are arranged in the gearbox, the large gear and the pinion are meshed with each other, the large gear is connected with the back end of the lead screw, and the back end of the pinion is connected with the handle through a connecting rod.

4. The hand-held pipe cutting device according to claim 1, wherein a bottom of a front end of the toothed fastener is provided with a plurality of fixture blocks, and the plurality of fixture blocks are locked in the groove on an outer wall of the lead screw.

5. The hand-held pipe cutting device according to claim 4, wherein the fixed block is provided with a via hole which the slide bar penetrates, and the back end of the fixed block is fixedly provided with a first spring, wherein the top end of the first spring being fixed to the back end of the toothed fastener, and a through hole is formed in a center of a top end of the fixed block, and the front ends of the fixture blocks extend in the through hole.

6. The hand-held pipe cutting device according to claim 1, wherein a second spring is arranged between a bottom of a front end of the slide bar and the fixed block.

7. The hand-held pipe cutting device according to claim 1, wherein a stop block is arranged at a top of the front end of the slide bar.

* * * * *